(12) United States Patent
Ajbani et al.

(10) Patent No.: US 7,055,566 B2
(45) Date of Patent: Jun. 6, 2006

(54) LIGHT WEIGHT RUBBER COMPOSITION CONTAINING CLAY

(75) Inventors: Manoj Ajbani, Copley, OH (US); Wen-Liang Hsu, Cuyahoga Falls, OH (US); Adel Farhan Halasa, Bath, OH (US); Ginger Lee, Ravenna, OH (US); Eric Sean Castner, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 110 days.

(21) Appl. No.: 10/923,071

(22) Filed: Aug. 20, 2004

(65) Prior Publication Data
US 2005/0020753 A1    Jan. 27, 2005

Related U.S. Application Data

(62) Division of application No. 10/783,135, filed on Feb. 20, 2004, now Pat. No. 6,884,835, which is a division of application No. 10/002,870, filed on Nov. 15, 2001, now Pat. No. 6,727,311.

(60) Provisional application No. 60/249,936, filed on Nov. 17, 2000.

(51) Int. Cl.
*B60C 11/00* (2006.01)
*B60C 27/00* (2006.01)
*B60C 1/00* (2006.01)

(52) U.S. Cl. ............... 152/209.5; 152/905; 152/209.1; 524/445; 524/447; 524/492; 524/493

(58) Field of Classification Search ............... 152/905, 152/209.1, 209.5; 524/445
See application file for complete search history.

(56) References Cited

U.S. PATENT DOCUMENTS

| | | | | |
|---|---|---|---|---|
| 2,170,191 A | 8/1939 | Fisher | ........................ | 525/360 |
| 2,795,567 A | 6/1957 | Ruehrwein | .................... | 521/31 |
| 2,885,381 A | 5/1959 | Sveflik | ...................... | 260/41.5 |
| 2,969,337 A | 1/1961 | Goodwin et al. | ........... | 106/253 |
| 3,004,936 A | 10/1961 | Howland et al. | ............. | 524/25 |
| 3,084,117 A | 4/1963 | Nahin et al. | ................. | 522/129 |
| 3,172,867 A | 3/1965 | Showalter | ..................... | 521/91 |
| 3,208,984 A | 9/1965 | Dekking | ........................ | 521/28 |
| 3,243,369 A | 3/1966 | Dekking | ..................... | 508/136 |
| 3,248,314 A | 4/1966 | Nahin et al. | ................... | 522/79 |
| 3,428,596 A | 2/1969 | Strand et al. | ................ | 524/451 |
| 4,400,485 A * | 8/1983 | Mukamal et al. | ........... | 524/444 |
| 5,036,133 A | 7/1991 | Coran | ......................... | 524/526 |
| 5,328,949 A * | 7/1994 | Sandstrom et al. | ......... | 524/262 |
| 5,723,529 A * | 3/1998 | Bernard et al. | .............. | 524/492 |
| 5,780,538 A * | 7/1998 | Cohen et al. | ............... | 524/494 |
| 6,469,089 B1 | 10/2002 | Wang et al. | ................. | 524/492 |
| 6,727,311 B1 * | 4/2004 | Ajbani et al. | ............... | 524/447 |
| 6,884,835 B1 * | 4/2005 | Ajbani et al. | ............... | 524/447 |

FOREIGN PATENT DOCUMENTS

EP      1029823 A2    8/2000

OTHER PUBLICATIONS

Wang et al, *Journal of Applied Polymer Science*, "Preparation and Characterization of Rubber-Clay Nanocomposites", vol. 78, Issue 11, 2000, pp. 1879-1883.

* cited by examiner

*Primary Examiner*—David W. Wu
*Assistant Examiner*—Ives Wu
(74) *Attorney, Agent, or Firm*—Alvin T. Rockhill

(57) ABSTRACT

This invention relates to a tire which is comprised of a generally toroidal-shaped carcass with an outer circumferential tread, two spaced beads, at least one ply extending from bead to bead and sidewalls extending radially from and connecting said tread to said beads; wherein said tread is adapted to be ground-contacting; wherein the tread is comprised of: (1) an amino group containing rubbery polymer, wherein said amino group containing rubbery polymer contains from about 0.1 weight percent to about 20 weight percent monomer units containing an amino group, (2) from 0.1 to about 25 phr of an organophilic 2:1 layered silicate clay selected from the group consisting of montmorillonite clays, bentonite clays, hectorite clays, saponite clays, nontronite clays, beidellite clays, fluorohectorite clays, stevensite clays, volkonskoite clays, sauconite clays, and laponite clays, and (3) a silica coupling agent.

20 Claims, No Drawings

US 7,055,566 B2

1

LIGHT WEIGHT RUBBER COMPOSITION CONTAINING CLAY

This is a divisional application of U.S. patent application Ser. No. 10/783,135, filed on Feb. 20, 2004, now U.S. Pat. No. 6,884,835, which is a divisional application of U.S. patent application Ser. No. 10/002,870, filed on Nov. 15, 2001 (now issued as U.S. Pat. No. 6,727,311) which claims the benefit of U.S. Provisional Patent Application Ser. No. 60/249,936 filed on Nov. 17, 2000.

BACKGROUND OF THE INVENTION

Tires are increasingly expected to provide higher and higher levels of performance characteristics. For instance, it is normally expected for tires to exhibit good traction characteristics on both dry and wet surfaces as well as low rolling resistance for good vehicle fuel economy. However, it has traditionally been very difficult to improve the traction characteristics of a tire without compromising its rolling resistance and treadwear. Low rolling resistance is important because good fuel economy is virtually always an important consideration. Reducing the weight of tires is also a goal of automobile and truck manufacturers because reduced weight results in improved fuel economy. Reducing the weight of tires is of particular importance in the case of aircraft tires. Good treadwear is also an important consideration because it is generally the most important factor in determining the life of the tire.

The traction, treadwear and rolling resistance of a tire is dependent to a large extent on the dynamic viscoelastic properties of the elastomers utilized in making the tire tread. In order to reduce the rolling resistance of a tire, rubbers having a high rebound have traditionally been utilized in making the tire's tread. On the other hand, in order to increase the wet skid resistance of a tire, rubbers that undergo a large energy loss have generally been utilized in the tire tread. In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubber material for automobile tire treads. However, such blends are not totally satisfactory for all purposes.

Rubbers having intermediate glass transition temperatures (−70° C. to −40° C.) compromise rolling resistance and treadwear without significantly increasing traction characteristics. For this reason, blends of rubbers having low glass transition temperatures and rubbers having high glass transition temperatures are frequently utilized to attain improved traction characteristics without significantly compromising rolling resistance or treadwear. However, such blends of rubbers having low glass transition temperatures and rubbers having high glass transition temperatures exhibit poor processability. This major disadvantage associated with such blends has greatly hampered their utilization in making tire tread compounds.

U.S. Pat. No. 2,885,381 discloses a composition of matter comprising a copolymer of a conjugated diene and a heterocyclic nitrogen containing monomer having a sole $CH_2=CH-$ substituent, such as 2-vinylpyridine, said copolymer having been compounded with 25–100 weight parts per 100 parts of said copolymer of a finely ground mineral pigment selected from the group consisting of silica and aluminum silicate as the sole reinforcing agent.

In recent years, there has been a trend to include silica as a filler in tire tread compounds to further improve traction

2 characteristics. U.S. Pat. No. 5,036,133 discloses a vulcanizable rubber composition that is comprised of: (A) an uncured natural or synthetic isoprene rubber, or one or more uncured butadiene-based synthetic rubbers, or uncured blends thereof, said uncured rubbers being sulfur vulcanizable, (B) a silica filler, (C) sulfur, (D) an organic accelerator and (E) a vinylpyridine-butadiene interpolymer co-activator, said interpolymer co-activator (E) containing from about 20 percent to about 65 percent by weight of vinylpyridine units, the amount of said vinylpyridine-butadiene copolymer co-activator being from about 0.5 to 2 parts by weight per 100 parts by weight of said rubber.

Authors Wang et. al in the *Journal of Applied Polymer Science*, Vol. 78, 1879–1883 (2000) describe a process of making clay-rubber mixtures by mixing an SBR latex or a styrene-vinylpyridine-butadiene latex with the hydrophilic unmodified clay without quaternary ammonium salts. In the case of the styrene-vinylpyridene-butadiene latex and clay composite, the expansion of clay gallery in the case of styrene-vinylpyridine composite was reported to increase from 1.24 to 1.46 nm, which is not significant enough. The intercalation of the rubber was minimal and very limited exfoliation is evident from stacks of clay layers as shown in the TEM micrographs for the said composite. The limited extent of intercalation is not expected to provide substantial property enhancement in tire materials. The article does not suggest of achieving a light-weight rubber composition and a tire with improved rolling resistance. The intercalation achieved by using the organically modified clay with quaternary ammonium surfactant by mixing it in a solution of rubber is also described, that resulted in somewhat better intercalation or expansion of clay galleries. Nevertheless, the mixing time of 12 hours was used, which is rather long for an industrial process. The publication does not disclose a bulk thermomechanical mixing method of making rubber-clay nanocomposite with uniform dispersion and high degree of exfoliation that will result in a light weight composition and lower hysteresis.

European Patent Application EP1029823 A2 describes preparation of rubber composite materials. This European Patent Application discloses a composite clay rubber material comprising at least one material selected from the group consisting of a first composite clay material and a second composite clay material; and a rubber material; said first composite material comprising a clay mineral having interlayer section; an onium ion having 6 or more carbon atoms, bonding to said clay mineral via an ionic bond for expanding said interlayer section and rendering said interlayer section compatible with an organic molecule; a first guest molecule having a polar group therein being at least partially incorporated into said expanded interlayer section and bonded to said clay mineral through a hydrogen bonding between said clay mineral and said polar group; and a second guest molecule as said organic molecule without a polar group as said organic molecule being at least partially incorporated into said expanded interlayer section, said first guest molecule having a molecular length equal to or smaller than that of said onium ion, said second guest molecule having a molecular length equal to or larger than that of the said onium ion; said second composite clay material comprising a clay mineral having an interlayer section; an onium ion having 6 or more carbon atoms, bonding to said clay mineral via ionic bond for expanding said interlayer section and rendering said interlayer section compatible with an organic molecule; and a main guest molecule as said organic molecule having a polar group in a main chain and/or side chain thereof being at least partially incorporated into said expanded interlayer section and bonded to said clay mineral through a hydrogen bonding between said clay mineral and said polar group, said main guest molecule having a molecular length equal to or larger than that of the said organic onium ion-wherein said organic onium ion contained in at least one of said first composite clay material and said second composite clay material is crosslinked with at least one of said second guest molecule and said main guest molecule and a molecule of said rubber material.

European Patent 1029823 A2 further describes that crosslinking be provided by using the onium ions with unsaturated groups for crosslinking with the guest molecule and rubber materials.

European Patent 1029823 A2 also discloses the rubber materials as being selected from the group consisting of natural rubber, isoprene rubber, chloroprene rubber, styrene rubber, nitrile rubber, ethylene-propylene rubber, ethylene-propylene-diene rubber, butadiene rubber, styrene-butadiene rubber, butyl rubber, epichlorohydrin rubber, acrylic rubber, urethane rubber, fluoro rubber and silicone rubber. This European Patent also specifies the polar group of said first guest molecule and/or said main guest molecule is at least one selected from the group consisting of hydroxyl group, halogen group, carboxyl group, anhydrous carboxylic acid group, Thiokol group, epoxy group and amino group. The polar functional groups are present on the first or main guest molecules. However, this patent application does not require or suggest that the polar functional groups can be present on the "rubber material."

European Patent 1029823 A2 suggests the method of producing a composite clay rubber material. It calls for the onium ion containing unsaturated groups and be crosslinked with the unsaturated groups of the guest molecules and also the rubber material. One embodiment of European Patent 1029823A2 calls for first incorporation of the clay with onium ion by contacting it with the first and second guest molecules. The process for incorporation or pre-dispersion of the clay in the guest molecules for preparing a clay-masterbatch required rather long mixing times for expanding or separating the clay layers and is considered herein somewhat industrially uneconomical. The masterbatch of the clay in the guest molecules was further kneaded with the rubber material to make the rubber-clay composite.

European Patent 1029823 A2 suggests the process for making a clay rubber material by blending with the rubber material. The first and second guest molecules were dissolved in a solvent when contacting the said rendered clay mineral. This additional step required long time for clay incorporation and furthermore, in such a process, all solvent was to be evaporated, which additionally requires considerable energy and extra care for handling solvents.

European Patent 1029823 A2 specifies the preferable main guest molecules as lauryl alcohol, stearyl aryl alcohol, oleyl alcohol, stearic acid, linolic acid, linolenic acid, stearyl chloride, or polyethylene, polypropylene or polyisoprene or polybutadiene with a polar group such as hydroxyl, carboxyl, epoxy or the like. This patent application mentions preparing a blend material of the composite clay material prepared with the guest molecule and synthetic resins such as polyethylene, polypropylene, polystyrene, polyisobutene, acrylic resin, polyurethane, and styrene-butadiene block copolymer. These resins have very limited use as rubber materials for use in tires and belts as many of these are not rubber-like materials. Resins like the styrene-butadiene block copolymers are not random copolymer rubbers that are generally used for specific performance achievement in tires & belts.

European Patent 1029823 A2 also specifies making the clay composite materials with two types of guest molecules, the first and the second. The first guest molecule had molecular length equal to or smaller than the onium ion and contained the polar group. The second guest molecule contained no polar group and had molecular weight exceed that of the onium ion. This process again required the use of two types of guest molecules for preparing the masterbatch. This patent application mentions the use of the second guest molecule with no polar groups as liquid polybutadiene, liquid polyisoprene, liquid butyl rubber or the like. Such liquid rubbers are known to plasticize the rubber materials and are known to generally improve processing of tire materials but at the same time, also increase the hysteresis or heat build-up or rolling resistance in a tire and are generally not used where low hysteresis and low rolling resistance are desired. This patent application also specifies making blend materials of the clay composite materials prepared with two types of guest molecules by blending with resins such as polyethylene, polypropylene, polybutylene, polyisoprene, polystyrene, acrylic resin, polyamide, polyester, or the like.

European Patent 1029823 A2 describes a composite clay rubber material obtained by kneading the composite clay materials prepared by blending the clay masterbatches of the guest molecules with the rubber like materials and crosslinking the guest molecule with rubber molecule. This European patent application also mentions that conventionally the rubber molecule cannot be uniformly dispersed in the clay mineral. European Patent 1029823 A2 has supposedly solved the problem of achieving a uniform dispersion of clay in a rubber material by masterbatching the clay mineral in the guest molecules and subsequently dispersing the masterbatch in a rubber material and crosslinking the guest molecules and rubber materials. Therefore, there is a need for obtaining the uniform dispersion of clay mineral in the rubber material without the need of pre-dispersion or masterbatching of the clay mineral in the guest molecules, firstly to eliminate the time consuming process of masterbatching, and secondly to eliminate the first and second guest molecules from the rubber materials, as they may deteriorate the properties due to plasticization or other undesirable effects in vulcanized articles of tire or belt rubber materials.

European Patent 1029823A2 does not teach that a light weight tire composition can be obtained. The said application does not teach that a low rolling resistance tire material can be developed. Furthermore, there is a need for a lightweight and low rolling resistance rubber material that can be prepared without the need for masterbatching of the clay in the guest molecules, for better production economies and better performance.

SUMMARY OF THE INVENTION

This invention relates to a rubber composition that can be used to reduce the weight of rubber articles, such as tires and power transmission belts, without compromising performance characteristics. For instance, the rubber composition of this invention can be utilized in manufacturing tires having reduced weight without compromising the rolling resistance or traction characteristics of the tire. This invention also relates to improving the strength, modulus and elongation of carbon black and silica filled compounds by addition of 2:1 layered silicate clays thereto without modifying the level of carbon black or silica. Such compounds have increased flexibility for tire side-wall applications with enhanced tensile strength. The rubber compositions of this invention are a blend of (1) an amino group containing rubbery polymer, wherein said amino group containing rubbery polymer contains from about 0.1 weight percent to about 20 weight percent of a monomer containing an amino group, (2) from about 0.1 phr to about 25 phr of a 2:1 layered silicate clay, preferably an organophilic 2:1 layered silicate clay, and optionally (3) a silica coupling agent. The rubber compositions of this invention will also typically contain from about 5 phr to about 100 phr of carbon black and optionally silica.

This invention more specifically discloses a rubber composition that is comprised of: (1) an amino group containing rubbery polymer, wherein said amino group containing rubbery polymer contains from about 0.1 weight percent to about 20 weight percent of a monomer containing an amino group, and (2) from about 0.1 phr to about 25 phr of a 2:1 layered silicate clay.

The present invention further discloses a tire which is comprised of a generally toroidal-shaped carcass with an outer circumferential tread, two spaced beads, at least one ply extending from bead to bead and sidewalls extending radially from and connecting said tread to said beads; wherein said tread is adapted to be ground-contacting; wherein the tread is comprised of: (1) an amino group containing rubbery polymer, wherein said amino group containing rubbery polymer contains from about 0.1 weight percent to about 20 weight percent of a monomer containing an amino group, (2) from about 0.1 phr to about 25 phr of a 2:1 layered silicate clay, and optionally (3) a silica coupling agent.

In this invention, the terms "rubber" and "elastomer" are used interchangeably. With the term rubber, it is generally referred to as a flexible polymer with a low glass transition temperature $T_g$ preferably less than about 0° C., more preferably below –20° C., and most preferably below –25° C., as measured in a differential scanning calorimeter at 10° C./minute heating rate.

In this invention, the terms crosslinking, curing and vulcanization are also used interchangeably.

DETAILED DESCRIPTION OF THE INVENTION

The light weight rubber compositions of this invention comprised of: (1) an amino group containing rubbery polymer, wherein said amino group containing rubbery polymer contains from about 0.1 weight percent to about 20 weight percent of a monomer containing an amino group, (2) from about 0.1 phr to about 20 phr a 2:1 layered silicate clay, and (3) optionally, a silica coupling agent. The 2:1 layered silicate clay will preferably be an organophilic 2:1 layered silicate clay.

This invention more specifically claims a process for making a vulcanized rubber article comprising the steps of (1) kneading (a) an amino group containing rubbery polymer, wherein said amino group containing rubbery polymer contains from about 0.1 weight percent to about 20 weight percent of a monomer containing an amino group, and (b) from 0.1 to about 25 phr of a 2:1 layered silicate clay which is an organophilic 2:1 layered silicate clay; and (c) conventional rubber compounding ingredients selected at least from the group of curing agents, cure accelerators, cure activators, processing aids, reinforcing fillers, oils, cure retarders, resins, and antidegradants at a temperature within the range of about 70° C. to about 190° C. in a bulk thermomechanical mixer to produce a mixed compound; (2) discharging the said mixed compound from the bulk thermomechanical mixer; (3) forming the mixed compound into an article; and (4) vulcanizing the article.

The amino group containing monomer will typically also contain a vinyl group ($CH_2$=$CH_2$—). Some representative examples of the amino group-containing vinyl monomers include polymerizable monomers having at least one amino group selected from the group consisting of primary, secondary and tertiary amino groups in their molecules. Of these, tertiary amino group-containing vinyl monomers are particularly preferred. These amino group-containing vinyl monomers may be used either singly or in any combination thereof. It is highly preferred that the amino group containing monomers are incorporated as a block or multiple blocks in the said rubber. The rubbery polymer is preferably comprised of at least one olefinic unsaturated monomers selected at least from the group of isoprene or butadiene, and optionally, another monomer selected from styrene or alpha-methyl styrene and at least one block of amine functional group containing monomers anchored to the said rubbery polymer.

Examples of the primary amino group-containing vinyl monomers include acrylamide, methacrylamide, p-aminostyrene, aminomethyl (meth)acrylate, aminoethyl (meth)acrylate, aminopropyl (meth)acrylate and aminobutyl (meth)acrylate.

Examples of secondary amino group-containing vinyl monomers include anilinostyrenes; anilinophenylbutadienes; and N-monosubstituted (meth)acrylamides, such as N-methyl (meth)acrylamide, N-ethyl (meth)acrylamide, N-methylolacrylamide and N-(4-anilinophenyl) methacrylamide.

Examples of tertiary amino group-containing vinyl monomers include N,N-disubstituted aminoalkyl acrylates, N,N-disubstituted aminoalkyl acrylamides, N,N-disubstituted amino-aromatic vinyl compounds and vinyl compounds having a pyridyl group.

Examples of the N,N-disubstituted amino alkyl acrylates include esters of acrylic acid or methacrylic acid, such as N,N-dimethylaminomethyl (meth)acrylate, N,N-dimethylaminoethyl (meth)acrylate, N,N-dimethylaminopropyl (meth)acrylate, N,N-dimethylaminobutyl (meth)acrylate, N,N-diethylaminoethyl (meth)acrylate, N,N-diethylaminopropyl (meth)acrylate, N,N-diethylaminobutyl (meth)acrylate, N-methyl-N-ethylaminoethyl (meth)acrylate, N,N-dipropylaminoethyl (meth)acrylate, N,N-dibutylaminoethyl (meth)acrylate, N,N-dibutylaminopropyl (meth)acrylate, N,N-dibutylaminobutyl (meth)acrylate, N,N-dihexylaminoethyl (meth)acrylate, N,N-dioctylaminoethyl (meth)acrylate and acryloylmorpholine. Of these, N,N-dimethylaminoethyl (meth)acrylate, N,N-diethylaminoethyl (meth)acrylate, N,N-dipropylaminoethyl (meth)acrylate, N,N-dioctylaminoethyl (meth)acrylate and N-methyl-N-ethylaminoethyl (meth)acrylate.

Examples of the N,N-disubstituted aminoalkyl acrylamides include acrylamide compounds or methacrylamide compounds such as N,N-dimethylaminomethyl (meth)acrylamide, N,N-dimethylaminoethyl (meth)acrylamide, N,N-dimethylaminopropyl (meth)acrylamide, N,N-dimethylaminobutyl (meth)acrylamide, N,N-diethylaminoethyl (meth)acrylamide, N,N-diethylaminopropyl (meth)acrylamide, N,N-diethylaminobutyl (meth)acrylamide, N-methyl-N-ethylaminoethyl (meth)acrylamide, N,N-dipropylaminoethyl (meth)acrylamide, N,N-dibutylaminoethyl (meth)acrylamide, N,N-dibutylaminopropyl (meth)acrylamide, N,N-dibutylaminobutyl (meth)acrylamide, N,N-dihexylaminoethyl (meth)acrylamide, N,N- dihexylaminopropyl (meth)acrylamide and N,N-dioctylaminopropyl (meth)acrylamide. Of these, N,N-dimethylaminopropyl (meth)acrylamide, N,N-diethylaminopropyl (meth)acrylamide and N,N-dioctylaminopropyl (meth)acrylamide are preferred.

Example of the N,N-disubstituted amino-aromatic vinyl compounds include styrene derivatives such as N,N-dimethylaminoethylstyrene, N,N-diethylaminoethylstyrene, N,N-dipropylaminoethylstyrene and N,N-dioctylaminoethylstyrene.

Examples of the pyridyl group-containing vinyl compounds include 2-vinylpyridine, 4-vinylpyridine, 5-methyl-2-vinylpyridine and 5-ethyl-2-vinylpyridine. Of these pyridyl group-containing vinyl monomers, 2-vinylpyridine which has the structural formula:

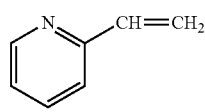

and 4-vinyl pyridine which has the structural formula:

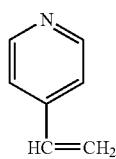

are preferred. The most preferred pyridyl group-containing monomer is 2-vinylpyridine. Amino group containing monomers that contain more that one amino group can be used. Some representative examples of such monomers include 2-vinyl pyrimidine which has the structural formula:

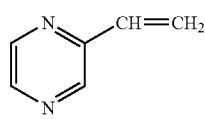

and 2-vinyl 1,3,5-triazine which has the structural formula:

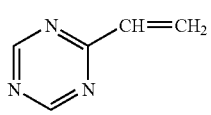

Heterocyclic amines having the structural formula:

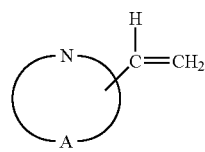

wherein A represents a —CH— group or a —CH$_2$— group and wherein the heterocyclic amine is aromatic or aliphatic and derivatives thereof are in general a preferred class of amino group containing monomers. The amino group containing monomer can be an N-vinyl substituted pyrrole, an N-vinyl substituted 3-pyrroline, an N-vinyl substituted 4-(1-pyrrolidinyl) piperidine, an N-vinyl substituted imidazole, an N-vinyl substituted 1-(2-pyridyl)piperazine, or an N-vinyl substituted 1-(2-pyrimidyl) piperazine. For instance, the amino group containing monomer can be of the structural formula:

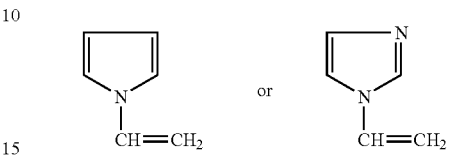

The amino group containing monomer can also contain more that one aromatic ring, such as vinyl substituted quinazoline, vinyl substituted quinaldine, or vinyl substituted quinoline. For instance, vinyl substituted quinazoline of the structural formula:

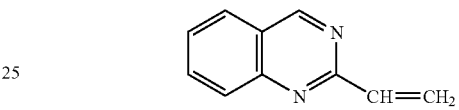

can be utilized as the amino group containing monomer. Vinyl group containing bicyclo amines can also be employed as the amino group containing monomer. For instance, the amino group containing monomer can be a vinyl substituted 1,4-diazocycloheptane or a vinyl substituted 1,5-diazacyclooctane.

For economic reasons N-vinyl 2-pyrrolidone and N-vinyl caprolactam are desirable amino group containing monomers. N-vinyl 2-pyrrolidone has the structural formula:

and N-vinyl caprolactam has the structural formula:

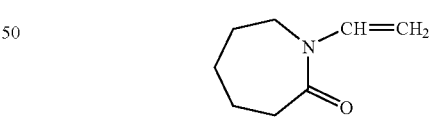

N-vinyl dialkyl amines are another class of amino group containing monomer that can be used. The N-vinyl dialkyl amines that can be used are typically of the structural formula:

wherein R and R' represent alkyl groups that can be the same or different. R and R' will typically represent alkyl groups that contain from 1 to about 10 carbon atoms. For instance the alkyl groups can be methyl groups, ethyl groups, n-propyl groups, iso-propyl groups, n-butyl groups, iso-butyl groups, or t-butyl groups. N-vinyl diisopropyl amine and N-vinyl diethylamine are representative examples of such amino group containing monomers. The alkyl groups will preferably contain from 1 to 4 carbon atoms.

The amino group containing monomer can also be a conjugated diolefin that is substituted with amino and/or cyano groups. Monomers of this type can be polymerized into the backbone of the amino group containing rubbery polymer. Some representative examples of such monomers include the following:

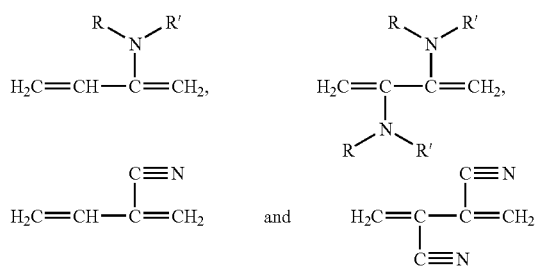

wherein R and R' can be the same or different and represent alkyl groups that contain from 1 to about 10 carbon atoms. It is typically preferred for R and R' to represent alkyl groups that contain from 1 to about 4 carbon atoms.

The amino group containing rubber will typically contain from about 0.1 weight percent to about 20 weight percent of the amino group containing monomer. In other words, repeat units in the amino group containing rubber are derived from the amino group containing monomer. Generally, the repeat units derived from the amino group containing monomer differ from the amino group containing monomer in that double bonds are consumed as a result of the polymerization. In any case, it is normally preferred for the amino group containing rubber to contain from about 0.5 weight percent to about 10 weight percent of the amino group containing monomer. It is typically more preferred for the amino group containing rubber to contain from about 1 weight percent to about 4 weight percent of the amino group containing monomer.

In synthesizing the amino group containing rubber one or more conjugated diolefin monomers are copolymerized with the amino group containing monomer. The conjugated diolefin monomers which can be utilized in the synthesis of rubbery polymers generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Other ethylenically unsaturated monomers, in addition to the amino group containing monomer, can also be copolymerized into the rubber. Some representative examples of additional ethylenically unsaturated monomers that can potentially be synthesized into the rubbery polymer include alkyl acrylates, such as methyl acrylate, ethyl acrylate, butyl acrylate, methyl methacrylate, and the like; vinylidene monomers having one or more terminal $CH_2=CH-$ groups; vinyl aromatics, such as styrene, α-methylstyrene, t-butylstyrene, bromostyrene, chlorostyrene, fluorostyrene, and the like; α-olefins such as ethylene, propylene, 1-butene, and the like; vinyl halides, such as vinylbromide, chloroethane (vinylchloride), vinylfluoride, vinyliodide, 1,2-dibromoethene, 1,1-dichloroethene (vinylidene chloride), 1,2-dichloroethene, and the like; vinyl esters, such as vinyl acetate; α,β-olefinically unsaturated nitriles, such as acrylonitrile and methacrylonitrile; α,β-olefinically unsaturated amides, such as acrylamide, N-methyl acrylamide, N,N-dimethylacrylamide, methacrylamide, and the like.

Rubbery polymers which are copolymers of one or more diene monomers with one or more other ethylenically unsaturated monomers will normally contain from about 50 weight percent to about 99 weight percent conjugated diolefin monomers and from about 1 weight percent to about 50 weight percent of the other ethylenically unsaturated monomers in addition to the conjugated diolefin monomers. For example, copolymers of conjugated diolefin monomers with vinylaromatic monomers, such as styrene-butadiene rubbers which contain from 50 to 95 weight percent conjugated diolefin monomers and from 5 to 50 weight percent vinylaromatic monomers, are useful in many applications. In such cases, the rubber will, of course, also contain from 0.1 weight percent to 10 weight percent of the amino group containing monomer.

Vinyl aromatic monomers are probably the most important group of ethylenically unsaturated monomers which are commonly incorporated into polydiene rubbers. Such vinyl aromatic monomers are, of course, selected so as to be copolymerizable with the conjugated diolefin monomers being utilized. Generally, any vinyl aromatic monomer which is known to polymerize with organolithium initiators can be used. Such vinyl aromatic monomers typically contain from 8 to 20 carbon atoms. Usually, the vinyl aromatic monomer will contain from 8 to 14 carbon atoms. The most widely used vinyl aromatic monomer is styrene. Some examples of vinyl aromatic monomers that can be utilized include styrene, 1-vinylnaphthalene, 2-vinylnaphthalene, α-methylstyrene, 4-phenylstyrene, 3-methylstyrene, t-butylstyrene, and the like.

The amino group containing rubber can be synthesized by emulsion polymerization, solution polymerization, vapor phase polymerization or bulk polymerization. The polymerization process can be conducted as a batch, semi-continuous, or continuous process. However, in solution polymerizations the amino group containing monomer will be added after substantially all of the other monomers have been incorporated into the rubbery polymer.

In many cases, it is preferred for the vinylpyridine containing rubbery polymer to be a vinylpyridine-styrene-butadiene terpolymer rubber. Such vinylpyridine-styrene-butadiene terpolymer rubbers will typically contain from about 0.5 weight percent to about 10 weight percent vinylpyridine, 0.5 weight percent to about 50 weight percent styrene and from about 50 weight percent to about 99 weight percent 1,3-butadiene. It is more preferred for the vinylpyridine-styrene-butadiene terpolymer rubbers to contain from about 1 weight percent to about 5 weight percent vinylpyridine, 5 weight percent to about 33 weight percent styrene and from about 66 weight percent to about 94 weight percent 1,3-butadiene. It is generally most preferred for the vinylpyridine-styrene-butadiene terpolymer rubbers to contain from about 1 weight percent to about 4 weight percent vinylpyridine, 10 weight percent to about 30 weight percent styrene and from about 82 weight percent to about 89 weight percent 1,3-butadiene.

The rubber compositions of this invention also contain from 0.1 phr (parts by weight per 100 parts by weight of rubber) to about 25 phr of an organophilic clay. It is typically preferred for the rubber compositions of this invention to contain from about 1 phr to about 10 phr of an organophilic clay. It is generally more preferred for the rubber compositions of this invention to contain from about 1 phr to about 7 phr of an organophilic clay. It is normally most preferred for the rubber compositions of this invention to contain from about 3 phr to about 6 phr of an organophilic clay.

The clays used in the practice of this invention are 2:1 layered silicate clays of the smectite, vermiculite and mica families. The 2:1 layered silicate clay can be synthetic or from a natural source. However, it should be understood that the 2:1 layered silicate clays used in the practice of this invention do not include clays that do not have any appreciable swelling potential, such as talc. The general clay terminology for the 2:1 layered silicates is described in the book *Developments in Sedimentology* 31, "Electron Micrographs of Clay Minerals", Elsevier Scientific Publishing Company, 1981, and is incorporated herein as a reference. The 2:1 layered silicate clays that are typically preferred include montmorillonite, bentonite, hectorite, saponite, nontronite, beidellite, fluorohectorite, stevensite, volkonskoite, sauconite laponite, related analogs thereof and their physical blends. Clays that have been chemically modified to make them compatible with organic materials are preferred and are generally referred to as "organophilic" clays or "organo-clays". The basic starting material used to make organophilic clay is an exchangeable clay of the smectite group and can include montmorillonite (commonly known and mined as bentonite), hectorite, saponite, attapulgite and sepolite. These clays include exchangeable cationic species such as sodium, potassium or calcium ions on their surface and between clay galleries or layers. In the course of manufacturing an organophilic clay, at least a portion of these exchangeable cationic species are substituted by an organic cation such as a quaternary amine, an organophosphorus ion, any other ion of the type known in the art as an oniumion, or the like. Some representative examples of surfactants that can be used include methyl tallow bis-2 hydroxy ethyl ammonium salt, dimethyl hydrogenated-tallow (2-ethylhexyl) ammonium salt, dimethyl benzyl hydrogenated-tallow ammonium salt, dimethyl dihydrogenated tallow ammonium salt, N-tallow alkyltrimethylenediamine, hydrogenated tallow amine, octadecylamine, octadecylamine and gamma-aminopropyltriethoxy silane, polyoxyethylene decycloxypropylamine, n-dodecylpyrrolidone, or their combinations and analogs. Quartemary ammonium surfactants, such as methyl tallow bis-2-hydroxyethyl ammonium chloride, dimethyl hydrogenated-tallow (2-ethylhexyl) ammonium methyl sulfate, and dimethyl dehydrogenated-tallow ammonium chloride, are typically preferred. The addition of the organic group modifies the clay, making it compatible with organic compositions and in general allowing it to provide rheological modification in select organic fluids. The clay will typically be modified with up to about 70 parts by weight of the organic surfactant. The clay will more typically be modified with up to about 60 parts by weight of the surfactant and will preferably be modified with up to about 40 parts by weight of the surfactant.

The organophilic 2:1 layered silicate clay may be modified with up to about 70 part by weight of a quaternary ammonium salt surfactant selected from the group consisting of methyl tallow bis-2-hydroxyethyl ammonium halides, methyl tallow bis-2-hydroxyethyl ammonium alkyl sulfates, methyl tallow bis-2-hydroxyethyl ammonium nitrate, methyl tallow bis-2-hydroxyethyl ammonium hydroxide, methyl tallow bis-2-hydroxyethyl ammonium acetate, methyl tallow bis-2-hydroxyethyl ammonium phosphate, dimethyl hydrogenated-tallow (2-ethylhexyl) ammonium halides, dimethyl hydrogenated-tallow (2-ethylhexyl) ammonium alkyl sulfates, dimethyl hydrogenated-tallow (2-ethylhexyl) ammonium nitrate, dimethyl hydrogenated-tallow (2-ethylhexyl) ammonium hydroxide, dimethyl hydrogenated-tallow (2-ethylhexyl) ammonium acetate, dimethyl hydrogenated-tallow (2-ethylhexyl) ammonium phosphate, dimethyl dehydrogenated-tallow ammonium halides, dimethyl dehydrogenated-tallow ammonium alkyl sulfates, dimethyl dehydrogenated-tallow ammonium nitrate, dimethyl dehydrogenated-tallow ammonium hydroxide, dimethyl dehydrogenated-tallow ammonium acetate, and dimethyl dehydrogenated-tallow ammonium phosphate.

It is not necessary for the quaternary ammonium surfactant to possess unsaturation for providing improved physical properties.

There is a large body of prior art relating to the manufacture of organophilic clays. For example, U.S. Pat. No. 2,531,427 and U.S. Pat. No. 2,531,440 both disclose general processes for the manufacture of organically substituted clays. U.S. Pat. No. 5,110,501 discloses a process for preparing organophilic clay in which the starting materials are reacted in a slurry under high shear. U.S. Pat. No. 5,334,241, discloses a low moisture, direct addition process for the fabrication of organophilic clays. U.S. Pat. No. 4,569,923 discloses yet another process for manufacturing organo-clays in which the clay is subjected to high energy pugmilling before reaction with the cation. The teachings of U.S. Pat. No. 2,531,427, U.S. Pat. No. 2,531,440, U.S. Pat. No. 5,110,501, and U.S. Pat. No. 5,334,241 are incorporated herein by reference in their entirety. In addition to processing parameters, the properties of an organophilic clay will depend upon the nature of the organic cation used for modification, as well as upon the amount of the cation incorporated into the clay. Specific modifiers are utilized for particular mixtures.

It has been found that the amount of organic cationic material that is incorporated into the clay will depend upon the particular technique used for its incorporation. The clays of interest have a generally lamellar structure, and the structure must be opened to some degree in order to permit the cation exchange reaction to take place. At the same time, care must be taken to avoid destroying the lamellar microstructure of the clay. One group of substitution techniques involves processing the clay in a slurry form, in which instance, solvation relaxes the clay's structure in order to permit penetration of the organic cations. While such techniques are effective, and widely employed, it is desirable to avoid such highly dilute reaction conditions since forming the slurry involves a time and space-consuming step. Furthermore, dewatering of the finished product is energy-intensive. For this reason, low moisture, direct addition techniques as described in U.S. Pat. No. 5,334,241, the disclosure of which is incorporated herein by reference in its entirety, are advantageously employed in the preparation of modified clays.

U.S. Pat. No. 5,616,286 discloses a method for manufacturing an organophilic clay comprising the steps of: (1) providing a substantially non-slurried volume of a clay having an exchangeable cationic species; (2) providing a volume of a cationic organic material; (3) subjecting said non-slurried clay and said cationic material to a first stage reaction process wherein said clay and said cationic material are subjected to a confining pressure of at least 3,000 psi (2.07×10⁷ Pa) while being mixed so that at least some of the exchangeable cationic species in the clay arc substituted by said cationic material so as to provide a non-slurried first stage reaction mixture, which comprises an organically substituted clay which has some residual, exchangeable cationic species therein and some residual cationic material in a free form; and (4) subjecting said non-slurried first stage reaction mixture to a second stage reaction process wherein said mixture is subjected to a confining pressure of at least 8,000 psi (5.52×10⁷ Pa) while being mixed so that at least some of the residual, exchangeable cationic species in the clay are substituted by said residual, cationic material. The teachings of U.S. Pat. No. 5,616,286 are hereby incorporated herein by reference in their entireties.

The rubber compositions of this invention can optionally further contain about 0.5 phr to about 15 phr of a silica coupling agent. The rubber compositions of this invention will typically contain about 1 phr to about 5 phr of a silica coupling agent. The rubber compositions of this invention will preferably contain 2 phr to 4 phr of a silica coupling agent. The weight ratio of the silica coupling agent to the clay will typically be within the range of 0.1:1 to 1.5:1. The weight ratio of the silica coupling agent to the clay will preferably be within the range of 0.2:1 to 1.1:1. The weight ratio of the silica coupling agent to the clay will more preferably be within the range of 0.4:1 to 0.7:1.

The silica coupling agent is generally a sulfur containing organosilicon compound Examples of suitable sulfur-containing organosilicon compounds are of the formula:

Z-Alk-Sn-Alk-Z    (I)

in which Z is selected from the group consisting of

where $R_1$ is an alkyl group of 1 to 4 carbon atoms, cyclohexyl or phenyl; wherein $R_2$ is alkoxy of 1 to 8 carbon atoms or cycloalkoxy of 5 to 8 carbon atoms; and wherein Alk is a divalent hydrocarbon of 1 to 18 carbon atoms and n is an integer of 2 to 8.

Specific examples of sulfur-containing organosilicon compounds which may be used in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2'-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2'-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis (methyl ethoxypropoxysilylethyl) tetrasulfide, 3,3'-bis (diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur-containing organosilicon compounds are the 3,3'-bis(trimethoxy or triethoxy silylpropyl) sulfides. The most preferred compound is 3,3'-bis(triethoxysilylpropyl) tetrasulfide. Therefore, as to Formula I, preferably Z is

where $R_2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The rubber compositions of this invention will typically also contain carbon black as a filler. The carbon black will normally be utilized at a level of about 5 phr to about 100 phr. It is generally preferred for the carbon black to be employed at a level of about 25 phr to about 75 phr. It is desirable to substitute as much of the organophilic clay for carbon black as possible to reduce the weight (specific gravity) of the rubber composition to the greatest possible extent. In some cases, it will be beneficial to utilize a combination of silica and carbon black as the filler. It is to be appreciated that the silica coupler may be used in conjunction with a carbon black (namely, pre-mixed with a carbon black prior to addition to the rubber composition) and such carbon black is to be included in the aforesaid amount of carbon black for the rubber composition. Talc can also be included as a portion of the filler to reduce cost.

The commonly employed siliceous pigments used in rubber compounding applications can be used as the silica, including pyrogenic and precipitated siliceous pigments (silica), although precipitated silicas are preferred. The siliceous pigments preferably employed in this invention are precipitated silicas such as, for example, those obtained by the acidification of a soluble silicate; e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the Journal of the American Chemical Society, Volume 60, page 304 (1930).

The silica may also be typically characterized by having a dibutylphthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3.

The rubbery compositions of this invention can be compounded utilizing conventional ingredients and standard techniques. For instance, the amino group containing rubbery polymer will typically be mixed with the silica coupling agent, the organophilic clay, optionally additional fillers, sulfur, accelerators, oils, waxes, scorch inhibiting agents and processing aids. The rubber compositions of this invention can also be blended with conventional rubbers, such as polybutadiene rubber, synthetic polyisoprene rubber, natural rubber, styrene-butadiene rubber (SBR), α-methyl-styrene-butadiene rubber, α-methylstyrene-isoprene rubber, styrene-isoprene-butadiene rubber (SIBR), styrene-isoprene rubber (SIR), isoprene-butadiene rubber (IBR), α-methyl-styrene-isoprene-butadiene rubber, and α-methylstyrene-styrene-isoprene-butadiene rubber. In most cases, the rubbery polymer will be compounded with sulfur and/or a sulfur-containing compound, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur-containing compound with 1 phr to 2.5 phr being preferred. It may be desirable to utilize insoluble sulfur in cases where bloom is a problem.

The rubber compounds of this invention will also normally include from 0.1 phr to 2.5 phr of at least one accelerator with 0.2 phr to 1.5 phr being preferred. Silica can also be included in the rubber compositions of this invention at a level of about 1 phr to about 10 phr. Antidegradants, such as antioxidants and antiozonants, will generally be included in the rubber blend in amounts ranging from 0.25 phr to 10 phr with amounts in the range of 1 phr to 5 phr being preferred. Processing oils will generally be included in the blend in amounts ranging from 2 phr to 100 phr with amounts ranging from 5 phr to 50 phr being preferred. The rubber compounds of this invention will also normally contain from 0.5 phr to 10 phr of zinc oxide with 1 phr to 5 phr being preferred. These blends can optionally contain from 0 phr to 10 phr of tackifier resins, 0 phr to 10 phr of reinforcing resins, 1 phr to 10 phr of fatty acids, 0 phr to 2.5 phr of peptizers and 0 phr to 1 phr of scorch inhibiting agents.

The silica and the organosilicon compound (silica coupling agent) will typically be mixed into the rubber blend utilizing a thermomechanical mixing technique. The mixing of the rubber formulation can be accomplished by methods known to those having skill in the rubber mixing art. For example, the ingredients are typically mixed in at least two stages; namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, silica and sulfur-containing organosilicon, and carbon black, if used, are mixed in one or more non-productive mix stages. The method of mixing the rubber formulation and the 2:1 layered silicates includes a bulk thermomechanical mixing technique. The method of mixing the rubber formulation and the 2:1 layered silicate does not include mixing the 2:1 layered silicates in an aqueous dispersion or latex of the rubber. The bulk thermomechanical mixing technique provides tremendous flexibility in achieving desired physical properties and performance on an industrial scale. The bulk thermomechanical mixing technique eliminates the need for a process for pre-intercalation or pre-dispersion or incorporation of the 2:1 layered silicates in the rubber that contains amino groups. This method of making the rubber and silicate blends has an advantage over the prior art in the sense that pre-intercalation of the 2:1 layered silicate in the guest molecules or dispersing medium requires long times, sometimes several hours. The pre-intercalation or dispersion of the 2:1 layered silicates aided with solvents requires additional energy for removal of the solvents, which is furthermore uneconomical. The bulk-thermomechanical method of preparing the rubber blends eliminates such a long process and provides additional flexibility of additions of required quantities of 2:1 layered silicates and other rubber compounding ingredients. In this invention, it was generally determined that sufficient exfoliation of the 2:1 layered silicate that was required for good balance of physical properties, was achieved in the thermomechanical bulk mixing process in about and up to 6 minutes of mixing time of the 2:1 layered silicate and the said rubber with amino groups. 2:1 layered silicate clay will preferably be an organophilic 2:1 layered silicate clay.

It is preferred for the rubber to be of high enough molecular weight so that the Mooney viscosity of the said rubber is in the range of 20 to about 120 ML 1+4@100° C., and when crosslinked, it can be used as a useful tire material.

The terms "non-productive" and "productive" mix stages are well known to those having skill in the rubber mixing art. Sulfur-vulcanizable rubber composition containing a sulfur-containing organosilicon compound, a vulcanizable rubber and silica are normally subjected to a thermomechanical mixing step. This thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, conventional thermomechanical working is typically carried out for a duration of time which is within the range of about 2 minutes to about 20 minutes. It is normally preferred for the rubber blend to reach a temperature which is within the range of about 145° C. to about 180° C. and to be maintained at said temperature for a period of time which is within the range of about 4 minutes to about 12 minutes. In practicing this invention the need for prolonged mixing at elevated temperatures is eliminated. However, the rubber compounds of this invention will be mechanically worked until a temperature within the range of 140° C. to 190° C. is attained. It is normally preferred for the mixing to be carried out until a temperature within the range of about 145° C. to 180° C. and most preferable within the range of about 155° C. to 170° C. is attained. The weight ratio of the silica coupling agent to silica will typically be within the range of about 0.05:1 to about 0.3:1. The weight ratio of the silica coupling agent to silica will preferably be within the range of about 0.1: I to about 0.25:1. The weight ratio of the silica coupling agent to silica will more preferable be within the range of about 0.12:1 to about 0.2:1.

The rubbery polymers of this invention can be used in tire treads in conjunction with ordinary tire manufacturing techniques. Tires are built utilizing standard procedures with the rubber compositions of this invention simply being substituted for the rubber compounds, such as standard styrene-butadiene rubber, typically used in the tread rubber. After the tire has been built with the rubber composition of this invention, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tire to have a duration of about 10 minutes to about 20 minutes with a cure cycle of about 12 minutes to about 18 minutes being most preferred.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE 1

In this experiment, a block polymer, containing 2 percent 2-vinylpyridine by weight was prepared. In the procedure used, 2330 g of a silica/alumina/molecular sieve dried premix containing 21.0 weight percent styrene and 1,3-butadiene in hexanes was charged into a one-gallon (3.8 liters) reactor. The ratio of styrene to 1,3-butadiene was 23:77. 4.1 ml of 1M solution of N,N,N',N'-tetramethylethylene diamine (TMEDA) in hexanes and 2.0 ml of 1.03 M solution of n-butyllithium (n-BuLi) were added to the reactor to initiate the polymerization. The molar ratio of TMEDA to n-BuLi was 2:1 and the target number average molecular weight (Mn) was 240,000.

The polymerization was carried out at 75° C. for 90 minutes. The GC analysis of the residual monomer contained in the polymerization mixture indicated that the polymerization was complete at this time. The polymerization mixture was cooled to 40° C. Freshly distilled 2-vinylpyridine (9.8 grams) was then added to the reactor and the polymerization was maintained at a temperature of 40° C. for 5 to 10 minutes. Then, 2 ml of 1 M ethanol in a solution of hexanes was added to shortstop the polymerization and polymer was removed from the reactor and stabilized with 1 phm of antioxidant. After evaporating the hexanes solvent, the resulting polymer was dried in a vacuum oven at 50° C.

The block terpolymer produced was determined to have a glass transition temperature (Tg) at −30° C. It was then determined to have a microstructure which contained 44.3 percent 1,2-polybutadiene units, 17.6 percent trans-1,4-polybutadiene units, 12.9 percent cis-1,4-polybutadiene units and 1.8% poly 2-vinylpyridine units. The Mooney ML-4 viscosity of the polybutadiene rubber at 100° C. was 118.

EXAMPLE 2

The procedure described in Example 1 was utilized in these examples except that the number average molecular weight (Mn) of the 23/77 SBR was targeted at 200,000. The glass transition temperatures (Tg) and Mooney ML-4 viscosities of the resulting polybutadienes were determined to be −29° C. and 100, respectively.

EXAMPLE 3

In this example, a pyridine end functionalized 15/85 SBR was prepared. In the procedure used, 2320 g of a silica/alumina/molecular sieve dried premix containing 21.0 weight percent styrene and 1,3-butadiene in hexanes solvent was charged into a one-gallon (3.8 liters) reactor. The ratio of styrene to 1,3-butadiene was 15:85. Then, 1.1 ml of neat N,N,N',N'-tetramethylethylene diamine (TMEDA) and 6.8 ml of 1.03 M solution of n-butyllithium (n-BuLi) in were added to the reactor to initiate the polymerization. The molar ratio of TMEDA to n-BuLi was 1:1 and the target number average molecular weight (Mn) was 70,000.

The polymerization was carried out at 70° C. for 60 minutes. The GC analysis of the residual monomer contained in the polymerization mixture indicated that the polymerization was complete at this time. Then, 7.0 ml of 1 M pyridine solution in hexane was added to the reactor and the reaction was continued at 70° C. for 30 minutes and then 7.5 ml of M ethanol solution in hexanes was added to shortstop the polymerization and the polymer was removed from the reactor and stabilized with 1 phm of antioxidant. After evaporating the hexanes solvent, the resulting polymer was dried in a vacuum oven at 50° C.

The resulting functionalized SBR was determined to have a glass transition temperature (Tg) at −40° C. It was then determined to have a microstructure which contained 50 percent 1,2-polybutadiene units, 35.0 percent 1,4-polybutadiene units, and 15% polystyrene units.

EXAMPLES 4–5

In this experiment, vinylpyridine-styrene-butadiene rubbers were synthesized via emulsion polymerization techniques. In the procedure used, a reactor having a capacity of 10 gallons (37.85 liters) was charged with 33.25 pounds (15.08 kg) of soft water, 16 grams. Tamol SN (sodium salt of condensed naphthalene sulfonic acid, 85 percent active), 40.0 grams tripotassium phosphate, 1046 grams of dehydrogenated rosin acid (potassium salt, 20 percent solution in water at pH 9.5) and 1911 grams of hydrogenated mixed fatty acids (sodium salt, 10 percent solution in water at pH 9.5). The pH of the solution in the reactor was adjusted to 10.2–10.8 with 10 percent sodium hydroxide. Next, to the reactor was added 23.7 grams of a solution of 82 grams water, 11.8 grams of the tetrasodium salt of EDTA and 3.0 grams of ferric sulfate heptahydrate. Then, 1638 grams of styrene and 455 grams of 2-vinylpyridine were added. Next, 27.3 grams of tert-dodecylmercaptan in 91.0 of styrene was added. The reactor was evacuated and 15.03 lbs (6.8 kg) of 1,3-butadiene was added. At 10° C., 10.3 grams of pinane hydroperoxide (44 percent active) in 91.0 grams of styrene was added. The polymerization temperature was 10° C. and the agitator speed was 250 rpm. After 6½ hours and about 65 percent conversion, the polymerization was shortstopped with a solution of 455 grams of water, 114 grams of the sodium salt of N,N-diethyldithiocarbamate (40 percent active) and 5.35 grams of N,N-diethylhydroxylamine (85 percent active). After stripping off the unreacted monomers under vacuum at 120° F. (49° C.), a sample of the latex was coagulated and the crumb rubber dried. The coagulation was carried out by adding the latex to water containing sodium chloride and polyamine. With vigorous stirring at 160° F. (71° C.), 10 percent sulfuric acid was added slowly to the latex until a pH of 3–4 was reached. The rubber crumb was dried at 150° F. (66° C.) in a forced air oven. The Mooney viscosity of the rubber was 22. Other properties of the polymer are shown in Table 1 below.

In Example 5, 1180 grams of styrene and 908 grams of 2-vinylpyridine were used and the same experimental procedure was followed as was used in Example 4. Data on the resulting vinylpyridine polymers are shown in Table I.

TABLE I

|  | Example 4 | Example 5 |
|---|---|---|
| Approximate Composition | 15S/5VP/80Bd | 10S/10VP/80BD |
| Mooney Viscosity | 22 | 16.5 |
| Bound Styrene | 13.7% | 11.9% |
| Bound Vinyl Pyridine | 5.7% | 11.5% |
| Tg (DSC) | −60.5° C. | −61° C. |

S = styrene,
VP = vinyl pyridine,
Bd = 1,3-butadiene

EXAMPLE 6

In this experiment, a rubbery terpolymer containing about 1 percent vinylpyridine, about 22 percent styrene and about 77 percent butadiene was synthesized. In the polymerization procedure employed, 33.28 pounds of soft water, 16 grams Tamol SN (sodium salt of condensed naphthalene sulfonic acid, 85 percent active), 40.0 grams of tripotassium phosphate, 1046 grams of dehydrogenated rosin acid (potassium salt, 20 percent solution in water at pH 9.5) and 1911 grams of hydrogenated mixed fatty acids (sodium salt, 10 percent solution in water at pH 9.5) were charged into a 10-gallon reactor. The pH of the solution in the reactor was adjusted to 10.2 to 10.8 with 10 percent sodium hydroxide. The pH of the solution was 10.7. Then, a solution of 455 grams water, 1.82 grams Hampene NaFe from Hamshire Chemical Co (sodium ferric ethylenediamine tetraacetate trihydrate) and 4 grams of sodium formaldehyde sulfoxylate was added to the reactor. Then, 2640 grams of styrene and 91.0 grams of 2-vinylpyridine were added. Next, 16.4 grams of tert-dodecylmercaptan in 91.0 grams of styrene was added. The reactor was evacuated and 13.64 pounds of 1,3-butadiene were added. At 10° C., 10.3 grams of pinane hydroperoxide (44 percent active in 91.0 grams of styrene was added. The emulsion polymerization temperature was 110° C. and the agitator speed was 250 rpm. After 4 hours and about 65 percent conversion, the polymerization was shortstopped with a solution of 455 grams of water, 114 grams of the sodium salt of N,N-diethyldithiocarbamate (40 percent active) and 5.35 grams of N,N-diethylhydroxylamine (85 percent active). After stripping off the unreacted monomers under vacuum at 120° F. for 2 hours, a sample of the latex was coagulated and the crumb rubber dried. The coagulation was carried out by adding the latex to water containing sodium chloride and polyamine. With vigorous stirring at 160° F., 10 percent sulfuric acid was added slowly to the latex until a pH of 3–4 was reached. The rubber crumb was washed three times with water and dried at 150° F. in a forced air oven. The Mooney viscosity of the rubber was determined to be 51 and it was determined to have a glass transition temperature at −52° C. The bound styrene content was determined to be 21.7 percent by FTIR and the bound vinylpyridine content was determined to be 1.5 percent from Carlo Erba nitrogen analysis. The glass transition temperature was determined by DSC (Differential Scanning Calorimetry) and is the onset glass transition temperature.

High Strength, Modulus and Elongation Nanocomposites

EXAMPLES 7–9

In this experiment, three rubber compositions were evaluated and compared. All three were based on 100 parts of (23/77 SBR)-b-(P(2-vinylpyridine) containing 1.8% (measured) poly 2-vinyl pyridine of Example 1. The recipes were mixed in two stages in a 260 cc batch Brabender mixer at 67% capacity of the mixer. In the first stage or the non-productive stage, the block copolymer, carbon black, stearic acid, zinc oxide, aromatic oils and/or unmodified clay or Organoclays (see Table II), were mixed for about 4.5 minutes at 50 RPM. The body temperature of the mixer was set at 125° C. The temperature of the mixed compounds after the first stage was recorded to 144° C. In the second or the productive stage, the non-productive compounds of the first stage were mixed with the sulfur, cure accelerators and/or activators for about 2.5 minutes at 35 RPM. The mixer body temperature was set at 95° C. and the temperature of the mixed compounds was measured to 110° C. The recipes for the Examples in parts are given below in Table II and Table III.

Differences in the compositions are explained. Example 7 contained 30 parts of carbon black, Example 8 contained 30 parts of carbon black and 5 parts of unmodified Na$^+$ Montmorillonite clay (Cloisite Na$^+$), and Example 9 contained 30 parts of carbon black and 5 parts of Organoclay (Cloisite 30B). Cloisite 30 B is Montrnorillonite clay that was ion-exchanged with organic surfactant Methyl Tallow bis-2-hydroxyethyl ammonium chloride. The typical concentration of the organic surfactant in Cloisite 30 B is around 30% by weight. Both clays are commercially available from Southern Clay Products.

TABLE II

| | First Stage Mixing | | |
|---|---|---|---|
| Ingredients | Example 7 (Comparative) Parts | Example 8 Parts | Example 9 Parts |
| (23/77 SBR)-b-(P(2-vinylpyridine) | 100 | 100 | 100 |
| General Purpose Tread Black (ASTM N 299) | 30 | 30 | 30 |
| Stearic Acid | 3 | 3 | 3 |
| Zinc Oxide | 3 | 3 | 3 |
| Aromatic Oil | 15 | 15 | 15 |
| Cloisite Na+ (Unmodified Clay) | — | 5 | — |
| Cloisite 30B (Organoclay) | — | — | 5 |
| Total Parts | 151 | 156 | 156 |

TABLE III

Second Stage Mixing

| Ingredients | Example 7 (Comparative) Parts | Example 8 Parts | Example 9 Parts |
|---|---|---|---|
| First Stage Mixed Compound | 151 | 156 | 156 |
| Rubber Makers' Sulfur | 2 | 2 | 2 |
| DPG (di phenyl guanidine) | 0.4 | 0.4 | 0.4 |
| CBS (n-cyclohexyl-2-benzothiazyl-sulfenamide) | 1.6 | 1.6 | 1.6 |
| Total Parts | 155 | 160 | 160 |

The productive compounds from the second stage were milled and the direction of milling was recorded. Torque build-up against time was studied by curing the productive compounds in an Oscillating Disk Rheometer (ODR) at 160° C. Tensile specimens were obtained by curing sheets in a compression molding press at 160° C. for 20 minutes for achieving the maximum state of cure. Tensile specimens were punched-out parallel to the mill direction and three specimens were tested per Example. Specific Gravity of the cured sheets was measured in duplicate by the hydrostatic weighing method in which the weight of the sample was measured in air and distilled water, and the specific gravity was calculated. The results are given below in Table IV.

TABLE IV

Physical Properties

| | Example 7 (Comparative) | Example 8 | Example 9 |
|---|---|---|---|
| 100% Modulus (Mpa) | 1.31 | 1.62 | 1.76 |
| 300% Modulus (Mpa) | 6.23 | 6.88 | 6.78 |
| Tensile Strength (Mpa) | 11.2 | 14.9 | 18.9 |
| % Elongation @ Break | 432 | 487 | 600 |
| Measured Specific Gravity | 1.062 | 1.087 | 1.077 |

A comparison of Example 8 that contained pure $Na^+$ Montmorillonite Clay with Example 7 (comparative) that contained no clay indicates that the 100% modulus and tensile strength can be increased with the unmodified clay that did not contain any organic surfactant. Comparison of Example 9 (Organoclay Cloisite 30B) with Example 7 (comparative) that contained no clay indicates that the tensile strength and elongation can be further increased by using an organoclay containing Methyl Tallow bis-2-hydroxyethyl ammonium chloride surfactant.

Transmission Electron Microscopy (TEM) was carried out on the tested tensile specimens away from the fracture and in the plane of the specimen thickness-length on the Example 9 to understand the origin of the dramatic improvement in the tensile strength that were possible on the addition of Cloisite 30B. Several TEM micrographs showed needle like clay platelets on their edges. The platelets were of the following approximate dimensions: 100–300 nm long and 2–12 nm thick. The clay platelets were predominantly exfoliated or delaminated from its original thickness that is generally known to be around 200–300 nm or so for the available Montmorillonite family of clay. Few clay platelets of larger thickness of 36 nm were also visible, but the population of such platelets was sparse. The exfoliated clay platelets were well dispersed in the elastomer matrix.

It is not the objective of this study to quantitatively characterize the dispersion and distribution of exfoliated or delaminated clay platelets, intercalated platelets and tactoidal clay platelets (primary aggregates). It is also recognized that in practice, the global population of clay platelets may contain all three categories, however, in the present work with organoclays, most of the clay platelets were found to be exfoliated or delaminated in the general size ranges as mentioned above. The unmodified clays or organoclays can be used to simultaneously improve the strength and elongation of rubber articles and components, such as engineered belts and tire sidewalls even though it is not expected to achieve a significant exfoliation of the layers in the themmomechanical mixing process.

Tread Compounds with Better Rolling Resistance & Light Weight

EXAMPLES 10–11

In this experiment nanocomposite compounds for utilization in tire treads that exhibit better rolling resistance were evaluated. Three examples were compared. Example 9 and 11 were compared with Example 10 (comparative). Mixing times and conditions were the same as mentioned in Examples 7–9. Example 10 (comparative) contained 45 parts of carbon black. Example 9 was explained previously and it contained reduced 30 parts of carbon black and 5 parts of Organoclay Cloisite 30B. Example 11 additionally contained 3 parts of 50% active silica coupling agent Si69 over the recipe of Example 9. The comparison is provided in Table V.

TABLE V

First Stage Mixing

| Ingredients | Example 10 (Comparative) Parts | Example 9 Parts | Example 11 Parts |
|---|---|---|---|
| (23/77 SBR)-b-(P(2-vinylpyridine) | 100 | 100 | 100 |
| General Purpose Tread Black (ASTM N 299) | 45 | 30 | 30 |
| Stearic Acid | 3 | 3 | 3 |
| Zinc Oxide | 3 | 3 | 3 |
| Aromatic Oil | 15 | 15 | 15 |
| Cloisite 30B (Organoclay) | — | 5 | 5 |
| SI69 on Carbon Black (50% active) | — | — | 3 |
| Total Parts | 166 | 156 | 159 |

TABLE VI

Second Stage Mixing

| Ingredients | Example 10 (Comparative) Parts | Example 9 Parts | Example 11 Parts |
|---|---|---|---|
| First Stage Mixed Compound | 166 | 156 | 159 |
| Rubber Makers' Sulfur | 2 | 2 | 2 |
| DPG (di phenyl guanidine) | 0.4 | 0.4 | 0.4 |
| CBS (n-cyclohexyl-2-benzothiazyl-sulfenamide) | 1.6 | 1.6 | 1.6 |
| Total Parts | 170 | 160 | 163 |

Tensile tests were conducted on samples of Example 10–11 as previously explained. Additionally, samples for all of the examples were cured in a Rubber Process Analyzer (RPA) for 20 minutes at 160° C. and dynamic properties were measured for the cured rubber samples. The physical properties are given in Table VII.

TABLE VII

Physical Properties

| | Example 10 (Comparative) | Example 9 | Example 11 |
|---|---|---|---|
| 100% Modulus (Mpa) | 1.89 | 1.76 | 2.54 |
| 300% Modulus (Mpa) | 9.04 | 6.78 | 9.99 |
| Tensile Strength (Mpa) | 17.4 | 18.9 | 15.8 |
| % Elongation @ Break | 467 | 600 | 448 |
| RPA, Cured G' 100° C. (kPa), 11 HZ, | | | |
| 2% Strain | 1570 | 1158 | 1404 |
| 10% Strain | 1156 | 926 | 1131 |
| RPA, Cured Tan Delta 100° C., 11 HZ, | | | |
| 2% Strain | 0.126 | 0.111 | 0.09 |
| 10% Strain | 0.141 | 0.126 | 0.107 |
| Measured Specific Gravity | 1.106 | 1.077 | 1.083 |

Comparison of Example 11 (Organoclay with coupling agent) with Example 9 (Organoclay) demonstrates that both 100% and 300% Modulus can be increased by using the silica coupling agent. Example 11 has significant lower Tan Delta values when compared with the all carbon black comparative Example 10, which is indicative of low rolling resistance. Additionally, the specific gravity of Example 11 is 1.083 against 1.106 for comparative Example 10, which will contribute to the reduced weight of the tire-tread, again leading to even lower rolling resistance and increased fuel economy.

Transmission Electron Microscopy was again carried-out on tested samples of Example 11. The clay morphology was found to be similar to the morphology of samples of Example 9 with majority of the clay platelets being in the exfoliated state in the similar size ranges as samples of Example 9. Also, the exfoliated platelets were well dispersed in the elastomer matrix.

COMPARITIVE EXAMPLES 12 AND 13

For comparative purposes, an emulsion polymerization was carried-out for preparation of a terpolymer rubber which contained pendant hydroxyl groups, particularly derived from diene hydrocarbon and vinyl aromatic compound monomers, particularly a hydroxyalkylmethacrylate, which is particularly hydroxypropyl methacrylate (HPMA). The styrenelbutadiene/HPMA terelastomer, having pendant hydroxyl groups, was obtained by terpolymerizing 1,3 butadiene, styrene and hydroxypropylmethacrylate (HPMA) monomers to form an aqueous latex, using potassium oleate soap as an emulsifier, and the terelastomer recovered therefrom. For such polymerization, the required amounts of 1,3 butadiene, styrene, and HPMA were charged to a suitable reactor which contained water and potassium oleate soap as an emulsifier. A conventional iron/sodium formaldehyde sulfoxylate activated hydroperoxide initiator system was employed and t-dodecyl mercaptan was utilized as a polymerization modifier. The polymerization was carried out at a temperature of about 10° C. and was shortstopped at a monomer conversion of about 60 to 65%. The HPMA was a blend of 2-hydroxypropyl methacrylate and 3-hydroxylpropyl methacrylate isomers in the weight ratio of about 80/20 respectively, as obtained from the Aldrich Chemical Company. The final terelastomer is characterized by having a styrene content of 44.1% and Mooney ML 1+4 viscosity of 74 (@ 100° C.) and a midpoint $T_g$ of −40° C., and about 3% of HPMA, with much of it available as the bound or attached. The HPMA containing terelastomer was bulk mixed with the organoclay and other compounding ingredients per the mixing set-up as mentioned in previous thermomechanical methods and the recipes are given in Table VIII and IX.

TABLE VIII

First Stage Mixing

| Ingredients | Example 12 (Comparative) Parts | Example 13 (Comparative) Parts |
|---|---|---|
| HPMA-terelastomer | 100 | 100 |
| General Purpose Tread Black (ASTM N 299) | 40 | 40 |
| Stearic Acid | 3 | 3 |
| Zinc Oxide | 3 | 3 |
| Aromatic Oil | 15 | 15 |
| Cloisite 30B (Organoclay) | — | 7 |
| Total Parts | 161 | 168 |

TABLE VI

Second Stage Mixing

| Ingredients | Example 12 (Comparative) Parts | Example 13 Parts |
|---|---|---|
| First Stage Mixed Compound | 161 | 168 |
| Rubber Makers' Sulfur | 2 | 2 |
| DPG (di phenyl guanidine) | 0.4 | 0.4 |
| CBS (n-cyclohexyl-2-benzothiazyl-sulfenamide) | 1.6 | 1.6 |
| Total Parts | 165 | 172 |

Tensile tests were conducted on samples of Examples 12 & 13 as previously explained. Additionally, samples for all of the examples were cured in a Rubber Process Analyzer (RPA) for achieving maximum cure state and dynamic properties were measured for the cured rubber samples. The physical properties are given in Table X.

TABLE X

Physical Properties

| | Example 12 (Comparative) | Example 13 (Comparative) |
|---|---|---|
| 100% Modulus (Mpa) | 3.99 | 4.79 |
| 300% Modulus (Mpa) | 14.13 | 14.5 |
| Tensile Strength (Mpa) | 16.2 | 16.5 |
| % Elongation @ Break | 366 | 364 |
| RPA, Cured G' 100° C. 11 Hz (kPa) | | |
| 2% Strain | 1864 | 1853 |
| 10% Strain | 1474 | 1365 |
| RPA, Cured Tan Delta 100° C., 11 HZ, | | |
| 2% Strain | 0.221 | 0.28 |
| 10% Strain | 0.202 | 0.26 |

Example 13 contained the Organoclay Cloisite 30B over the Example 12 that contains carbon black as the reinforcement. Example 13 that contains a rubber with hydroxyl groups and the organoclay did not improve the tensile strength, elongation at break or the dynamic stiffness (G'@2% strain) and furthermore increased the tan delta at 2% indicating increased hysteresis, which is not desirable. This demonstrates that the mere addition of a 2:1 layered silicate containing an onium ions and mixing it in a thermomechanical mixer with a rubber containing polar hydroxyl functional groups does not result in a tire material of improved performance. Example 13 has the highest tan delta indicating high hysteresis. Furthermore, Example 13 has lower G' at 10% strain when compared with Example 12, indicating strain softening in the samples that is also associated with greater hysteresis at higher strains in the Example 13 that contain the organoclay.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire which is comprised of a generally toroidal-shaped carcass with an outer circumferential tread, two spaced beads, at least one ply extending from bead to bead and sidewalls extending radially from and connecting said tread to said beads; wherein said tread is adapted to be ground-contacting; wherein the tread is comprised of: (1) an amino group containing rubbery polymer, wherein said amino group containing rubbery polymer contains from about 0.1 weight percent to about 20 weight percent monomer units containing an amino group, (2) from 0.1 to about 25 phr of an organophilic 2:1 layered silicate clay selected from the group consisting of montmorillonite clays, bentonite clays, hectorite clays, saponite clays, nontronite clays, beidellite clays, fluorohectorite clays, stevensite clays, volkonskoite clays, sauconite clays, and laponite clays, and (3) a silica coupling agent.

2. A tire as specified in claim 1 wherein said amino group containing rubbery polymer contains from about 0.5 weight percent to about 10 weight percent monomer units containing an amino group.

3. A tire as specified in claim 2 wherein the organophilic 2:1 layered silicate clay is present in the tread at a level which is within the range of about 1 phr to about 10 phr.

4. A tire as specified in claim 3 wherein the silica coupling agent is present in the tread at a level which is within the range of about 0.5 phr to about 15 phr.

5. A tire as specified in claim 4 wherein the ratio of the silica coupling agent to the organophilic 2:1 layered silicate clay is within the range of about 0.1:1 to about 1.5:1.

6. A tire as specified in claim 4 wherein the monomer units containing an amino group are derived from 2-vinylpyridine.

7. A tire as specified in claim 4 wherein the monomer units containing an amino group are derived from 4-vinylpyridine.

8. A tire as specified in claim 5 wherein the tread is further comprised of carbon black, and wherein the carbon black is present at a level which is within the range of about 5 phr to about 100 phr.

9. A tire as specified in claim 8 wherein the carbon black is present at a level which is within the range of 25 phr to 75 phr.

10. A tire as specified in claim 8 wherein the amino group containing rubbery polymer contains from about 1 weight percent to about 4 weight percent monomer units containing an amino group.

11. A tire as specified in claim 8 wherein the organophilic clay is present in the tread at a level which is within the range of about 1 phr to about 7 phr and wherein the silica coupling agent is present at a level which is within the range of about 1 phr to about 5 phr.

12. A tire as specified in claim 3 wherein the tread is further comprised of about 1 phr to about 70 phr of silica.

13. A tire as specified in claim 12 wherein the organophilic 2:1 layered silicate clay is modified with up to about 70 part by weight of a quaternary ammonium salt surfactant.

14. A tire as specified in claim 8 wherein the organophilic 2:1 layered silicate clay is a montmorillonite clay.

15. A tire as specified in claim 8 wherein the silica coupling agent is present in the tread at a level which is within the range of about 2 phr to about 4 phr.

16. A tire as specified in claim 4 where the amino group containing rubbery polymer is comprised of repeat units that are derived from a conjugated diolefin monomer.

17. A tire as specified in claim 16 wherein the conjugated diolefin monomer is selected from the group consisting of isoprene and 1,3 butadiene.

18. A tire as specified in claim 1 wherein the amino group containing rubbery polymer is comprised of repeat units that are derived from N-vinyl 2-pyrrolidone.

19. A tire as specified in claim 1 wherein the amino group containing rubbery polymer is comprised of repeat units that are derived from N-vinyl caprolactam.

20. A tire as specified in claim 1 wherein the amino group containing rubbery polymer is comprised of repeat units that are derived from a N-vinyl dialkyl amine having the structural formula:

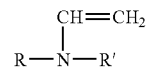

wherein R and R' can be the same or different and represent alkyl groups that contain from 1 to about 10 carbon atoms.

* * * * *